July 2, 1935.  J. F. ROMAN  2,006,606

YIELDABLE JEWEL BEARING

Filed March 11, 1933

INVENTOR.
Joseph F. Roman
BY Stuart Freeman
ATTORNEY.

Patented July 2, 1935

2,006,606

UNITED STATES PATENT OFFICE 2,006,606

YIELDABLE JEWEL BEARING

Joseph F. Roman, Wilmington, Del.

Application March 11, 1933, Serial No. 660,384

4 Claims. (Cl. 58—140)

The object of the invention broadly is to provide improvements in jewel bearings, but more especially to provide what might be termed a yieldable bearing, operative to absorb shocks and sudden jars imposed upon the relatively delicate staff-pivots and jewels of the balance wheel, whenever the watch is dropped or is struck a sudden blow, in any manner more violent than that for which its mechanical structure is designed to withstand.

Another object is to provide a jewel bearing of this general nature, which is of the utmost simplicity, is characterized by the maximum of efficiency, and consists in the minimum of number of parts, namely, the plate or balance bridge, the jewel-supporting disc, or setting, and the spiral spring connecting the same.

A further object is to provide in such a structure, the combination of a plate or balance bridge having a recess, which is defined by an inwardly diverging conical wall surface, a jewel-supporting setting, which is defined by a conical peripheral surface, substantially parallel with said first surface, and a spiral spring normally under radial tension between said surfaces, and to contract in the opposite direction upon said supporting surface.

Still another object is to provide a construction and assembly of this nature, which can be brought together in normal operative relation by first snapping the spring about said setting and then snapping the outer periphery of said spring into said recess, and which can be disassembled by means of practically any available pointed instrument, by which the spring is easily pried from its seat within said recess.

With these objects in mind, the invention comprises further details of construction and operation, which are fully brought out in the following description, when read in conjunction with the accompanying drawing, in which Fig. 1 is an enlarged bottom plan view of a portion of the upper plate or balance bridge equipped with one embodiment of the invention;

Figure 1:
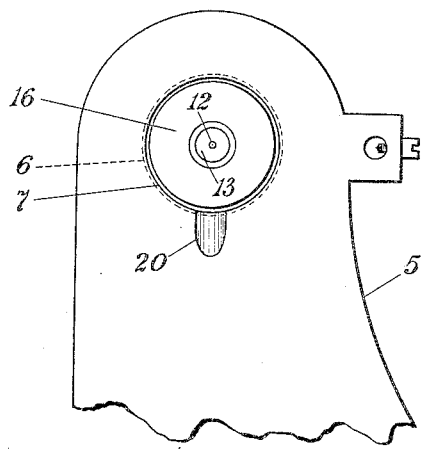

Referring to the drawing, there is shown a plate 5, which is intended to represent either one of the usual plates comprising the supporting frame of the balance wheel of a watch, clock, or similar mechanism, and will hereinafter be referred to as the plate. This plate is provided with an aperture, characterized by a cylindrical portion 6 and the outwardly tapering conical or under-cut portion 7. In said cylindrical portion is tightly secured by friction or otherwise the usual cap jewel setting 8, duly supporting the cap or end jewel 9 in operative position, so as to limit the axial or longitudinal movement of the balance staff 10.

The jewel-supported end portion of said balance staff, comprises a cylindrical end portion 11, which extends thru an aperture 12 in the usual hole jewel 13, which last-named jewel is secured in the usual manner within the central aperture 14 of an annular boss 15, which latter extends towards and comes in direct axial contact with said cap jewel, said boss comprising a preferably integrally formed axial extension of a setting or plate 16.

Figure 3:
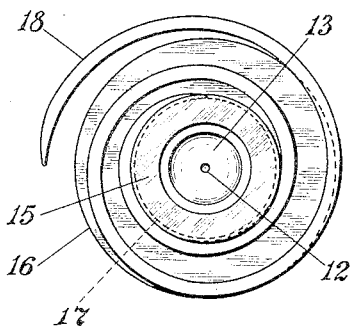
Fig. 3 is a plan view of the jewel-supporting setting and the spiral spring also supported thereby.
Figure 2:
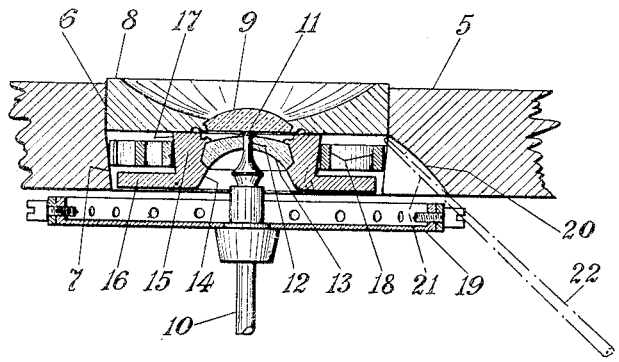
Fig. 2 is a vertical diametrical section on the line 2—2 of Fig. 1.

It will be noted that the outer peripheral surface of said boss is conical, the surface being substantially parallel with that of the under-cut conical portion 7 of the recess in the plate 5. It is about this conical surface 17 that the central portion of a spring 18 is sprung, and retained in position by a radial contraction about and upon said last-named surface. The said setting and spring being thus assembled (Fig. 3), the spring itself may be contracted and sprung similarly into the under-cut portion of said recess, as shown in Figs. 1 and 2. Thus, the radially outward tension of said spring continues to maintain the same within said recess, while its radially inward tension maintains it in gripping engagement upon the boss 15 of the setting 16.

This structure operates to maintain the balance wheel 19, or for that manner any other axially movable part of the mechanism, in predetermined centralized position, while the cap jewel 9 as hereinbefore mentioned, prevents the staff 10 from longitudinal motion or end play. In order to easily remove this spring-and-plate assembly from within said recess, a second recess 20 is provided, which extends from within the under-cut portion of said first recess diagonally outwardly thru the adjacent surface of the plate 5, to provide an entrance way thru which the pointed end portion 21 of a style, needle, or pin 22, may be inserted in the said first recess beyond the outer periphery of the spring 18, as shown in Fig. 2.

With this construction the hole jewel setting and its support may be practically and easily dismounted from operative position and replaced therein. Furthermore, sudden jars of the watch or other mechanism, transversely of the axis of the staff 10, will be absorbed by the spring 18, which will permit said staff to move laterally, instead of attempting to move in a fixed bearing, with the result that in such cases the relatively slender end portion or pivot 11 of said staff has heretofore been broken off, or the hole jewel has been fractured, or both. Following any sudden jar or jerk, the said spring immediately and automatically recenters said shaft in operative position, so that no injury either temporary or permanent is felt by the staff, or the jewel, or other element, which it may operatively support.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim and desire to protect by Letters Patent of the United States is:—

1. In a chronometer mechanism, the combination of a cap jewel, and a supporting element therefor, with a frame member provided with a circular recess comprising a cylindrical portion in which said supporting element is secured by direct engagement, and an inwardly expanding portion, a hole jewel, a supporting element for said hole jewel comprising a tapering portion, and radially resilient means contacting with and extending between the walls of the second portion of said recess and the tapering portion of said second element, to yieldingly position said second element operatively with respect to said frame.

2. In a chronometer mechanism, the combination of a cap jewel, and a supporting element therefor, with a frame member provided with a circular recess comprising a cylindrical portion in which said supporting element is secured by direct engagement, and an inwardly expanding portion, a hole jewel, a supporting element for said hole jewel comprising a plate having an axially positioned boss provided with a peripheral surface which increases in diameter away from said plate, and a radially resilient member extending between and in cooperation with the wall of the second portion of said recess and the peripheral surface of said boss, to yieldingly position said element operatively with respect to said frame.

3. In a chronometer mechanism, the combination of a cap jewel, and a supporting element therefor, with a frame member provided with a circular recess comprising a cylindrical portion in which said supporting element is secured by direct engagement, and an inwardly expanding portion, a hole jewel, a supporting element for said hole jewel comprising a plate having an axially positioned boss provided with a peripheral surface which increases in diameter away from said plate, and a spiral spring in expansible engagement with the wall of the second portion of said recess, and in contracting engagement with the peripheral surface of said boss, to yieldingly position said second element operatively with respect to said frame.

4. In a chronometer mechanism, the combination of a cap jewel, and a supporting element therefor, with a frame member provided with a circular recess comprising a cylindrical portion in which said supporting element is normally secured by direct engagement, and an inwardly expanding portion, a hole jewel, a supporting element for said hole jewel comprising a tapering portion, and a spiral spring contracting about the tapering portion of the second element and expanding into engagement with the wall of the second portion of said recess, to yieldingly position said second element operatively with respect to said frame.

JOSEPH F. ROMAN.